(12) United States Patent
Biggerstaff et al.

(10) Patent No.: US 11,856,893 B2
(45) Date of Patent: Jan. 2, 2024

(54) CONCAVE SUPPORT AND ADJUSMENT SYSTEM FOR COMBINE HARVESTER

(71) Applicant: AGCO Corporation, Duluth, GA (US)

(72) Inventors: Joseph Mark Biggerstaff, Wichita, KS (US); Ivan Rogers, Kenilworth (GB)

(73) Assignee: AGCO Corporation, Duluth, GA (US)

( * ) Notice: Subject to any disclaimer, the term of this patent is extended or adjusted under 35 U.S.C. 154(b) by 498 days.

(21) Appl. No.: 17/040,462

(22) PCT Filed: Feb. 26, 2019

(86) PCT No.: PCT/IB2019/051535
§ 371 (c)(1),
(2) Date: Sep. 22, 2020

(87) PCT Pub. No.: WO2019/224615
PCT Pub. Date: Nov. 28, 2019

(65) Prior Publication Data
US 2021/0068344 A1     Mar. 11, 2021

Related U.S. Application Data

(60) Provisional application No. 62/675,240, filed on May 23, 2018.

(30) Foreign Application Priority Data

Jun. 22, 2018 (GB) ...................................... 1810243

(51) Int. Cl.
*A01F 12/28*  (2006.01)
*A01F 12/26*  (2006.01)

(52) U.S. Cl.
CPC .............. *A01F 12/28* (2013.01); *A01F 12/26* (2013.01)

(58) Field of Classification Search
CPC ................................. A01F 12/28; A01F 12/26
See application file for complete search history.

(56) References Cited

U.S. PATENT DOCUMENTS 2,053,148 A * 9/1936 James ........................ A01F 7/06
460/109
3,470,881 A * 10/1969 De Pauw ................ A01F 12/20
460/109
(Continued)

FOREIGN PATENT DOCUMENTS

CN          102630439 A     8/2012
CN          204860175 U    12/2015
(Continued)

OTHER PUBLICATIONS

UK Intellectual Property Office, Search Report for related UK Application No. GB1810243.4, dated Dec. 14, 2018.
(Continued)

*Primary Examiner* — Arpad F Kovacs
*Assistant Examiner* — Arpad Fabian-Kovacs

(57) ABSTRACT

A rotary thresher for a combine harvester including at least a first concave and a second concave, which may be rotated around a rotor to move to or from a threshing position or one or more of one or more resting positions. The concaves are mounted in a frame that is configured to rotate around the rotor such that the second concave moves during rotation from a first resting position to the threshing position while the first concave is moved from the threshing position to a second resting position.

13 Claims, 11 Drawing Sheets

(56) References Cited

U.S. PATENT DOCUMENTS

| | | | | |
|---|---|---|---|---|
| 4,222,395 A | * | 9/1980 | Johnston | A01F 12/24 460/66 |
| 4,274,426 A | * | 6/1981 | Williams | A01F 7/062 460/67 |
| 4,284,086 A | * | 8/1981 | Williams | A01F 12/18 460/80 |
| 4,330,000 A | * | 5/1982 | Peiler | A01F 12/28 460/109 |
| 4,337,781 A | * | 7/1982 | Brundage | A01F 7/065 460/104 |
| 4,718,434 A | * | 1/1988 | Raineri | A01F 7/065 460/109 |
| 4,738,270 A | * | 4/1988 | Huhman | A01F 7/065 460/107 |
| 5,803,807 A | | 9/1998 | Satzler | |
| 6,468,152 B2 | * | 10/2002 | Moriarty | A01F 7/06 460/67 |
| 8,133,100 B2 | * | 3/2012 | Regier | A01F 12/26 460/109 |
| 8,628,390 B2 | * | 1/2014 | Baltz | A01F 12/24 460/109 |
| 8,636,568 B1 | * | 1/2014 | Farley | A01F 12/26 460/68 |
| 9,554,519 B2 | * | 1/2017 | Davenport, III | A01F 12/28 |
| 9,980,435 B2 | * | 5/2018 | Mackin | A01F 12/28 |
| 10,716,259 B2 | * | 7/2020 | Matousek | A01F 12/28 |
| 11,375,667 B2 | * | 7/2022 | Broholm | A01F 12/28 |
| 11,553,650 B2 | * | 1/2023 | Ritter | A01F 12/24 |
| 2007/0178951 A1 | * | 8/2007 | Voss | A01F 12/28 460/109 |
| 2011/0151950 A1 | | 6/2011 | Regier et al. | |
| 2017/0164559 A1 | * | 6/2017 | Matousek | A01F 7/062 |
| 2017/0290263 A1 | * | 10/2017 | Kemmner | A01D 41/127 |
| 2017/0339832 A1 | * | 11/2017 | Matousek | A01F 12/28 |
| 2019/0159403 A1 | * | 5/2019 | Haar | A01F 7/06 |

FOREIGN PATENT DOCUMENTS

| | | |
|---|---|---|
| DE | 10 2016 123182 A1 | 6/2017 |
| GB | 2148086 A | 5/1985 |
| WO | 98/25448 A1 | 6/1998 |
| WO | 2013/082236 A1 | 6/2013 |
| WO | 2014/191804 A1 | 12/2014 |

OTHER PUBLICATIONS

European Patent Office, International Search Report for International Application No. PCT/IB2019/051535, dated Sep. 23, 2019.

* cited by examiner

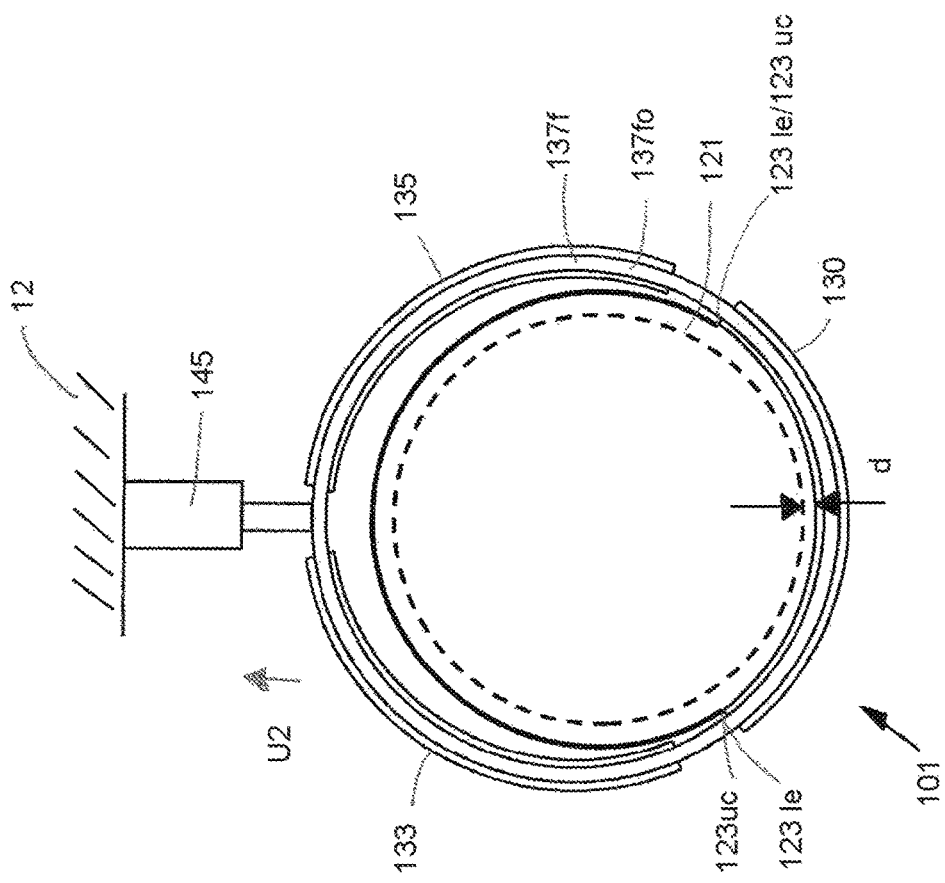
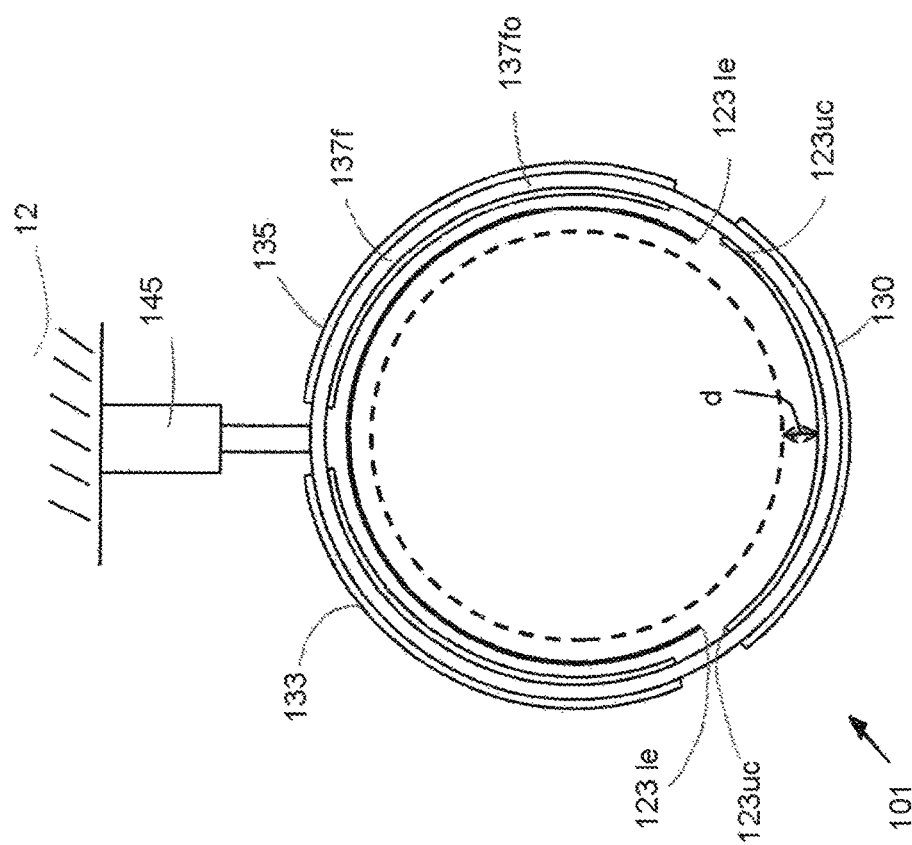
FIG 8a
FIG 8b

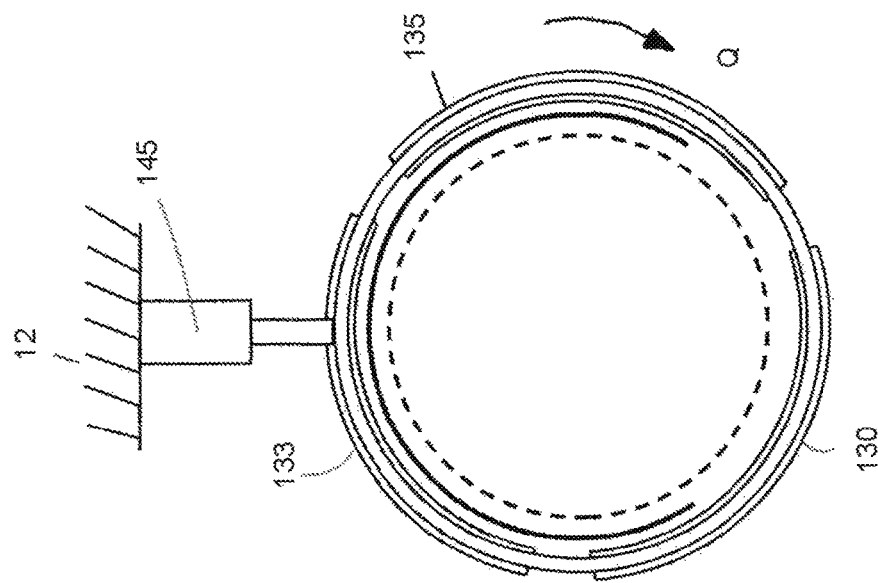
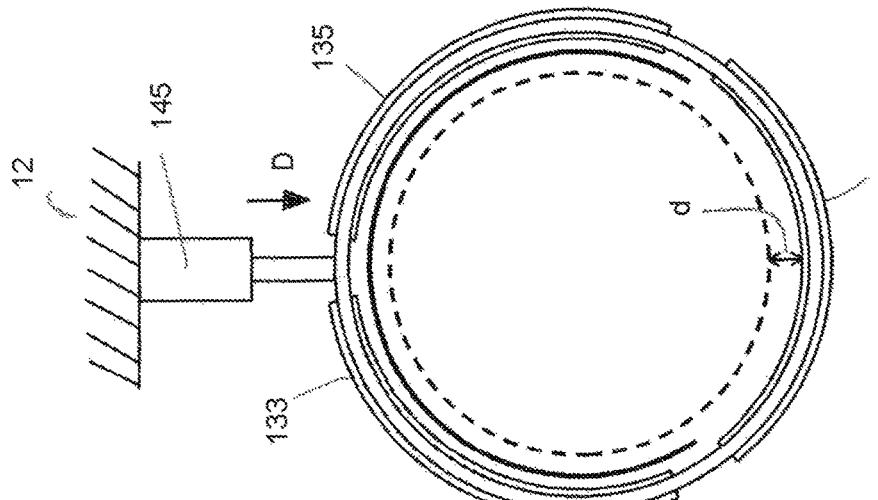
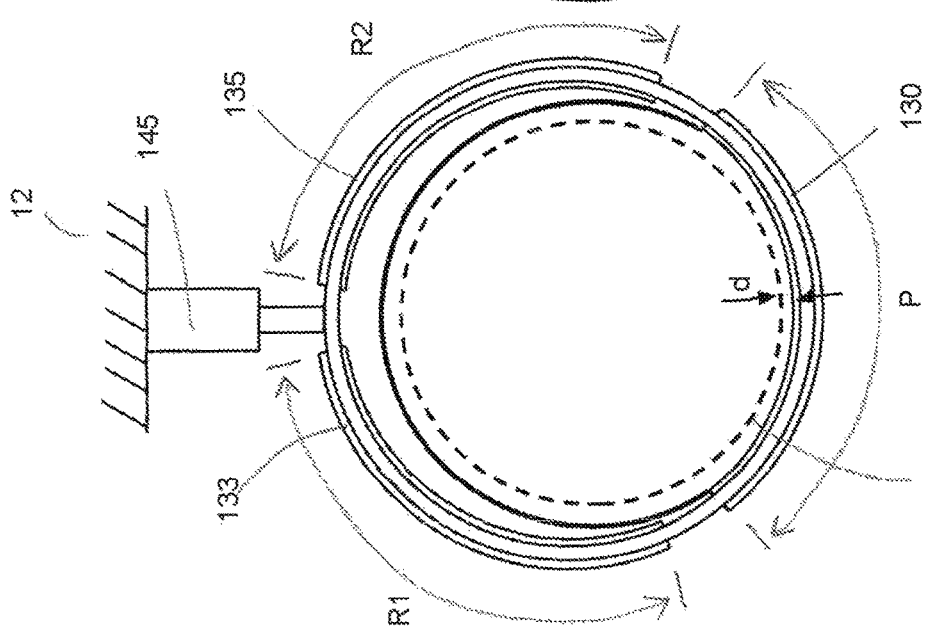

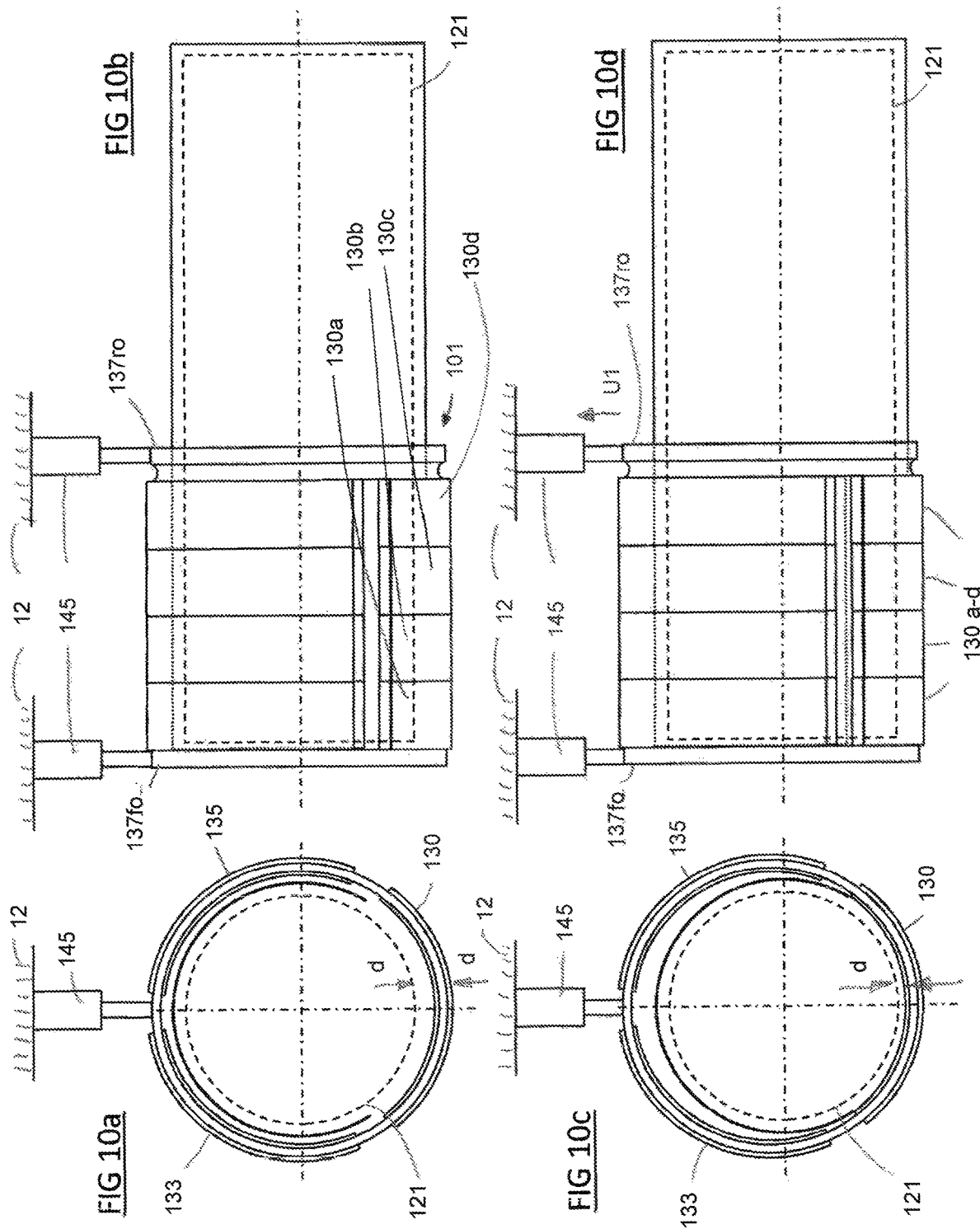

CONCAVE SUPPORT AND ADJUSMENT SYSTEM FOR COMBINE HARVESTER

FIELD OF INVENTION

The present invention relates to a combine harvester comprising a rotary threshing system for threshing cut crop material. In particular, the invention relates to a concave changing system for use with such a rotary threshing system in a combine harvester.

BACKGROUND OF INVENTION

Combine harvesters are provided with a threshing system. A known form of threshing system is an axial flow or rotary threshing system. An axial rotary threshing system typically comprises a rotor which rotates on an axis within a rotor housing, said axis substantially parallel to the longitudinal axis of the harvester.

A rotor housing is provided which surrounds the rotor. The rotor housing is generally cylindrical and includes an arcuate grate or concave set in the lower section to allow separated grain to fall onto an underlying cleaning mechanism (or 'shoe') nominally situated beneath the thresher collection pan. The upper section of the housing tends to comprise enclosing curved cover plates.

The rotor drives crop material around inside the rotor housing, and in particular against the concave set, so as to thresh the crop to separate grain from MOG (material other than grain), the grain falling through gaps in the concave to the shoe beneath. The rotor is normally a cylinder, on the outside of which are rasp bars of varying design for threshing the crop against the concaves. Concaves are also of varying design, depending on such things as crop type and crop condition.

Crop material is fed into a front inlet section where the crop material is engaged by flighting elements on the rotor. The crop material is conveyed as a ribbon or mat in a generally rearward axial and helical path in the space between the rotor and the rotor housing. Axial conveyance of the crop material is driven by the interaction between guide vanes provided on the inside surface of the upper cover plates and threshing and separating elements provided on the rotor. Threshing of the crop material and the subsequent separation of the grain therefrom is mostly carried out in the lower portions of the helical path by the interaction between the threshing and separating elements respectively and the concave. The clearance between the envelope of the rotor and its threshing/separating elements and the concave is adjustable. Separated crop material passes by gravity through the grate whereas the longer bulkier straw residue is conveyed towards an outlet or discharge section at the rear of the housing.

A combine harvester with a known rotary threshing system is shown in schematic representation in FIG. 1.

FIG. 2 illustrates a known concave support structure and concave adjustment system in schematic form, looking at the front of the threshing system in the direction of arrow A in FIG. 1.

With reference to FIGS. 1 and 2, a combine harvester 10 includes a frame or chassis 12 from or to which many working parts of the combine are mounted; front wheels 14, and rear steerable wheels 16. A cutting header 17 is detachably supported on the front of a feederhouse 18 which is pivotable about a transverse axis to lift and lower the header 17 in a conventional manner.

The combine 10 is driven in a forward direction F across a field of standing crop in a known manner. The header 17 serves to cut and gather the crop material before conveying such into feederhouse 18 and elevator 19 housed therein. At this stage the crop stream is unprocessed. It should be understood that combine harvesters are employed to harvest a host of different crops including cereal, rice, corn and grass seed. The following description will make reference to various parts of the cereal crop stream but it should be understood that this is by way of example only and does not by any means limit the applicability of the invention to harvesting other harvesting crops.

The cut crop stream is conveyed rearwardly from the feederhouse 18 to a processor designated generally at 20 in FIG. 1. The processor 20 includes axial flow threshing and separating rotors 21,22 which are each housed side-by-side inside respective rotor housings—housing 23 surrounding rotor 21 in FIG. 1—and are fed at their front end by a feed beater 25. The rotors serve to thresh the crop stream in a front 'threshing' region, separate the grain therefrom in a rear 'separating' region, and eject the straw residue through the rear of the machine either directly onto the ground in a windrow or via a straw chopper.

Each rotor housing 23 is generally cylindrical and is made up of an opaque upper section and a foraminous lower section which includes a set of side-by-side arcuate concave grate segments 30a, 30b, 30c, 30d which allow the separated material to fall by gravity onto a grain collection pan located below for onward conveyance to a cleaning system (not shown). Guide vanes (not shown) are secured to the inside of the rotor housing and serve, in conjunction with the crop engaging elements on the rotor, to convey the stream of crop material in a generally rearward spiral path from front to rear.

With reference to FIG. 2, the sets 30,31 of concave grate segments are positioned underneath the respective rotors 21,22 and wrap around a portion of the cylindrical swept envelopes 21', 22' of the rotors. The concave grate segments are carried upon support structures S1, S2, S3, S4 that are movably mounted to the frame 12 so as to allow adjustment of the clearance between the segments 30,31 and the rotors 21,22 and rotor envelopes 21', 22'.

FIG. 3 shows the two sets of concaves 30a to 30d and 31a to 31d, and FIG. 4 shows a single concave portion 31a in slightly greater detail.

Accordingly, in this known embodiment, the concave sets are able to be moved upwards and downwards relative to the rotor so as to adjust the clearance distance between the concave segments and the rotor and rotor envelope. As is known, being able to control the gap between the rotor and the concave, and subsequently the thickness of the crop mat, is important. This is because various crop characteristics may vary considerably, even in a single field on a single day. For example, in some field portions crop may be thin, and in other portions thick; or moisture levels may vary; or slightly different crop varieties may be planted in fields which are being harvested on a same day.

Another known harvester type is the Class VIII RT490 combine from Versatile, which has a 'Rotating Concave Rotary System'. In this product, a 360° concave wraps around a large rotor and counter-rotates. The counter rotation of the concave in relation to the rotor creates a larger threshing and separating area. However, this machine does not offer any adjustment to the distance between the rotor and the concaves.

It is also known that a combine may be used in several fields on a single day where the type, as well as variety of crop being harvested may vary. Accordingly, it is necessary or desirable for concaves to be changed on occasion. This is usually a fairly involved procedure requiring an operator to stop the combine, usually after having come away from a harvesting area to a hard-stand area where spare concaves are stored, then exit the machine, access the thresher and remove a current concave (which may involve removal of various panels and the use of various tools), then fit a replacement concave and re-assemble the machine, then return to the harvesting area. All of this, disadvantageously, takes effort and, most particularly disadvantageously when harvesting, time. Further, the size and storage of extra concaves is cumbersome and it can take up a lot of room in a service truck or in a barn. In addition, older operators may not have the physical strength to change concaves, or may find it difficult. These problems are amplified in the Versatile system, where there is a greater number of concave sets to change should a different type of concave be required, and it is more difficult to access these concaves.

A solution to these problems would be desirable.

SUMMARY OF INVENTION

Accordingly there is provided in an aspect a rotary thresher comprising:
 a rotor;
 a first concave located at a lower portion of the thresher, said first concave located in a threshing position such as to be proximate to said rotor such that cut crop material may be threshed between said rotor and said first concave;
 wherein the apparatus further comprises:
 a second concave disposed on a frame common to the first and second concaves, said first concave also being disposed on said frame, such that the first and second concaves at least partially surround the rotor, and;
 wherein the frame is mounted so that it may be moved to rotate around the rotor such that the second concave may be moved from a first rest position to the threshing position whilst the first concave is moved from the threshing position to a second resting position.

The advantage of this arrangement is that a concave may be changed within a very short space of time, simply by moving the frame such that a first concave on the frame is substituted for by a second concave on the frame. Further, the invention reduces the need for concave storage at a separate facility, as well as addressing the issue of the physical strength needed to change concaves, as there is no requirement to lift concaves from one place to another and rotating a frame, should the rotation be manually driven, is comparatively easy. It also gives the operator more readily available threshing options while in the field, which is advantageous with ever changing crop types and conditions.

In an embodiment, there may also be provided a mechanism for moving the concaves relative to the frame and around the rotor. In an embodiment, the frame may comprise a pair of annular supports, one of the pair at each end of the concaves, provided with tracks on which the concaves are movably attached such as to be able to move on the tracks and thus around the rotor.

The concaves may be mounted on a sub-frame which rotates with the concaves and is mounted on the frame so as to enable the rotation of the sub-frame and concaves. The sub-frame may comprise a pair of annular mounting members. Further longitudinal support members may be provided. The concaves may be connected to the annular mounting members or to the longitudinal support members.

In an embodiment, there is also provided a rotor housing comprising a generally hollow cylinder, and the concaves rotate or move around the outside of the rotor housing. The rotor housing may be provided with a cut out section which coincides with the threshing position. The remainder of the rotor housing, which is not a cut out section, acts to shield the resting concaves from the rotor and retain threshed grains within the general envelope of the rotor housing. The resting positions of the concaves which are not in the threshing positions are situated in positions shielded from the rotor by the rotor housing.

In embodiments, a driving mechanism is provided for rotating the frame and its connected concaves around the rotor. Such a mechanism can be controlled from within a cabin of the combine harvester. The advantage of this is that the operator can change concaves without ever leaving the cab. This could be while the machine is actually harvesting. However an operator may also stop the machine when doing this change over. The driving mechanism may be a belt and motor system, with a belt connecting an outside engagement portion of the frame and a driving pinion of a motor. In an alternative embodiment, and outside engagement portion of the frame may comprise a toothed section for engagement by a gear wheel driven by a motor.

In embodiments, the frame may be locked in certain discrete positions. This enables the concave sets or segments to be locked into the threshing position.

There may be two or more concave sets of grate segments. Three or four concave sets may be typically used. There will be at least a concomitant number, or more, of threshing and resting positions.

The concave support structure may also comprise an adjustment mechanism for raising and lowering the structure. The advantage of this is that the concave which is in the threshing position may be adjusted up and down so as to vary the distance between the concave and the rotor/rotor envelope. This allows adjustment for threshing, and also allows that the concave may be raised for threshing, then lowered to allow rotation of the concaves around the rotor to move a different concave to the threshing position. The adjustment mechanism may comprise an actuator, which may be hydraulic, pneumatic or electric.

Upon raising of a concave in the threshing position, the concave set or segment may be urged into cooperative alignment with the cut out section of the rotor housing.

In an aspect, there may be provided a combine harvester comprising any of the aforementioned embodiments.

In an aspect, there may be provided a rotary thresher comprising;
 A rotor;
 Two or more concaves disposed on a frame surrounding the rotor and said frame mounted so that it may be rotated around the rotor;
Characterised in that:
 During a harvesting process, the frame is stationary such that one of the concaves is located in a stationary threshing position situated at a lower portion of the thresher.

In embodiments, the concave set or segments in the threshing position are in closer proximity to the rotor than the other set or segments.

In embodiments, there may also be provided a stationary rotor housing comprising a generally hollow cylinder. Part of the rotor housing may be non-foraminous and may sit between the rotor and the concave or concaves that are not in the threshing position. The concave in the threshing position may sit in the space of a cut-out section of the rotor housing.

In an embodiment, the frame may be raised or lowered relative to the rotor so that the concave set or segment in the threshing position may be moved closer to or further away from the rotor.

BRIEF DESCRIPTION OF THE SEVERAL VIEWS OF THE DRAWINGS

The invention will now be described in more detail by reference to the attached Figures.

FIG. 5a shows a frontal view from the direction of arrow A as per FIG. 1.

FIG. 5b shows a side view of the system, with internal swept volume of the rotor in view-through form.

FIG. 5c shows a side view of the system.

FIG. 5d shows a side view of the rotor housing of the system only.

FIG. 8A illustrates the concave support and adjustment system of FIGS. 5a-5d.

FIG. 8B illustrates movement of the concave support and adjustment system of FIG. 8A.

FIG. 9a illustrates the concave support and adjustment system of FIGS. 5a-5d.

FIG. 9b illustrates the concave support and adjustment system of FIGS. 5a-5d.

FIG. 9c illustrates the concave support and adjustment system of FIGS. 5a-5d.

FIG. 10a illustrates the concave support and adjustment system of FIGS. 5a-5d.

FIG. 10b illustrates the concave support and adjustment system of FIGS. 5a-5d.

FIG. 10c illustrates the concave support and adjustment system of FIGS. 5a-5d.

FIG. 10d illustrate the concave support and adjustment system of FIGS. 5a-5d.

DETAILED DESCRIPTION

Figure 1:
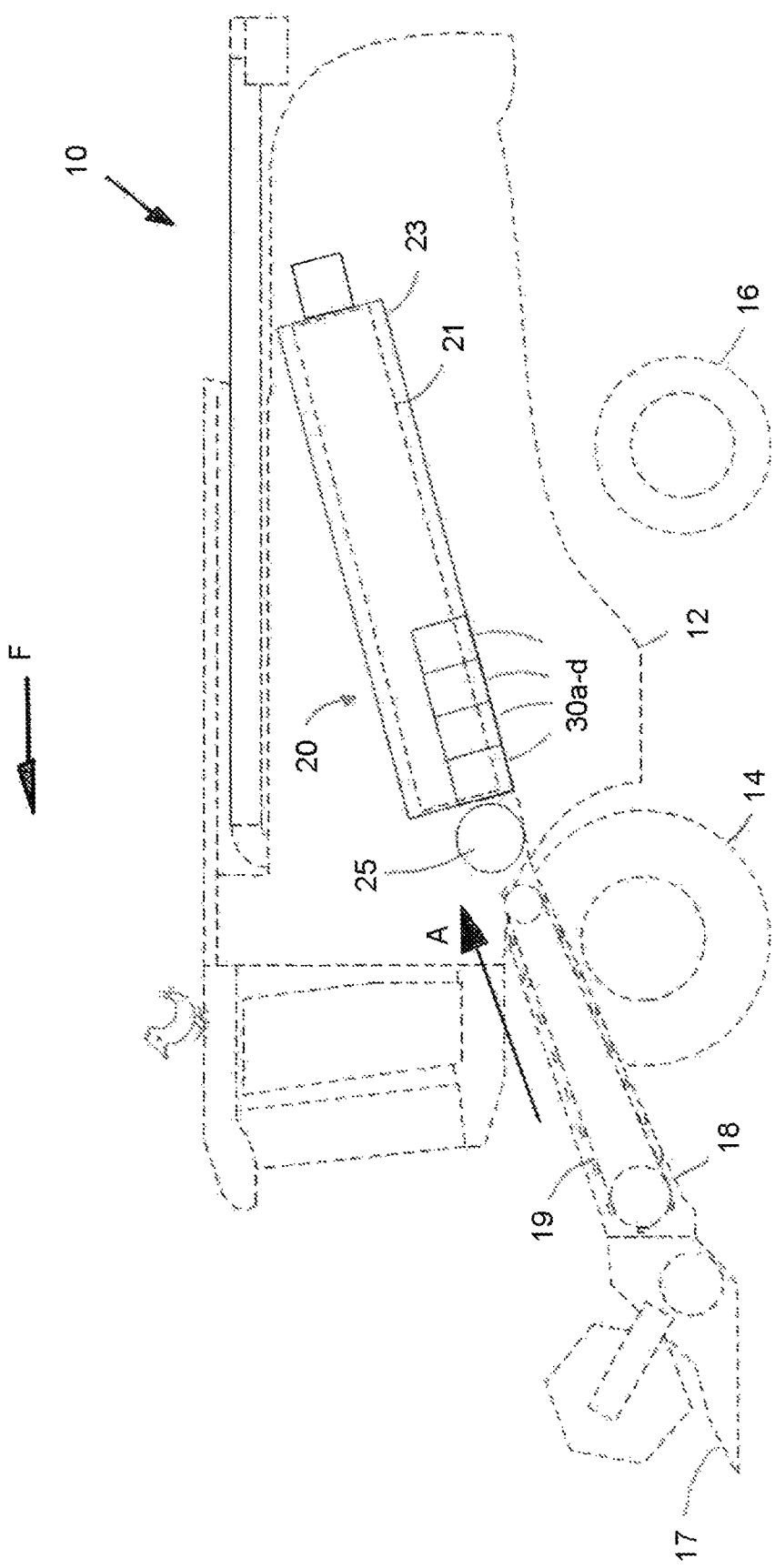
FIG. 1 illustrates a schematic representation of a combine harvester with a known rotary threshing system.
Figure 2:
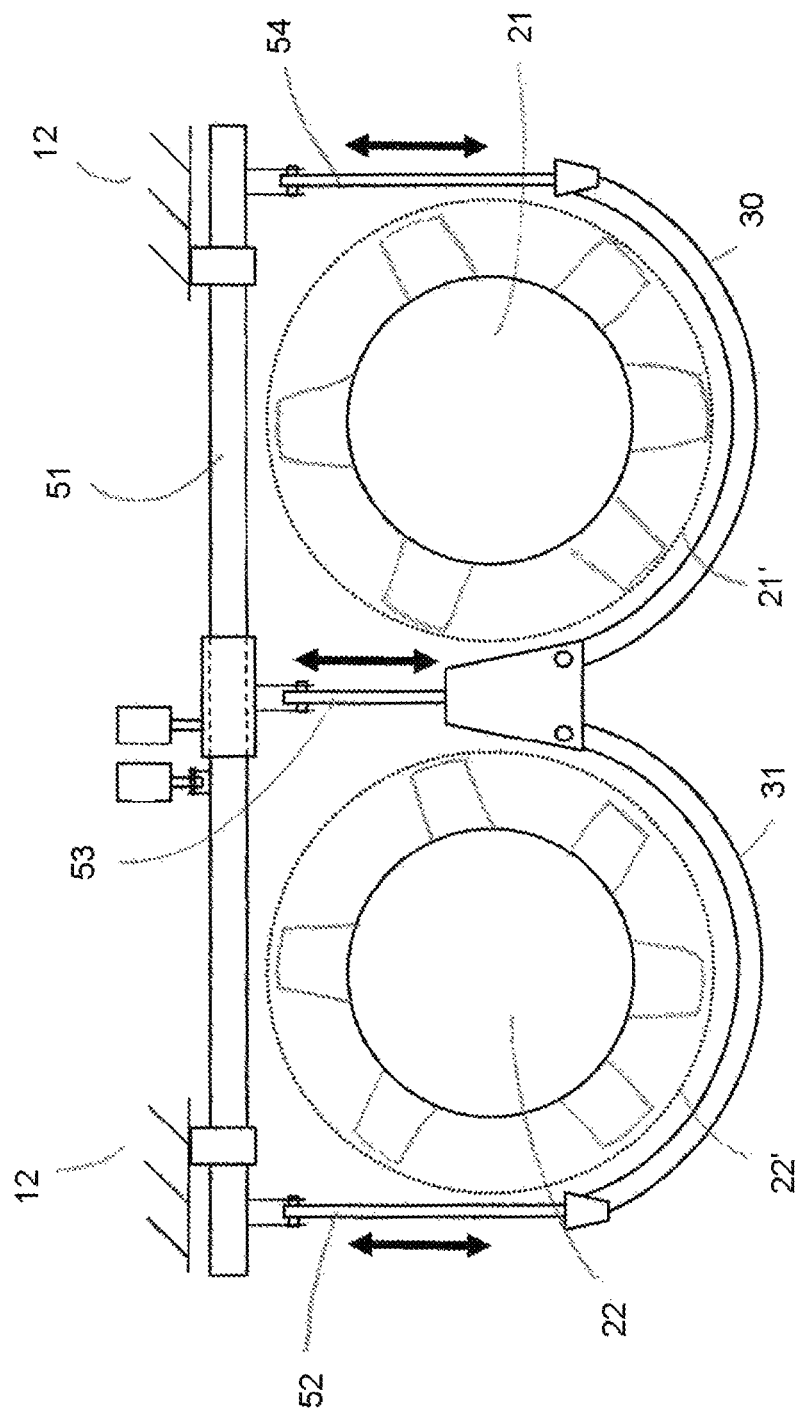
FIG. 2 illustrates a known concave support structure and concave adjustment system in schematic form, looking at the front of the threshing system in the direction of arrow A in FIG. 1.
Figure 3:
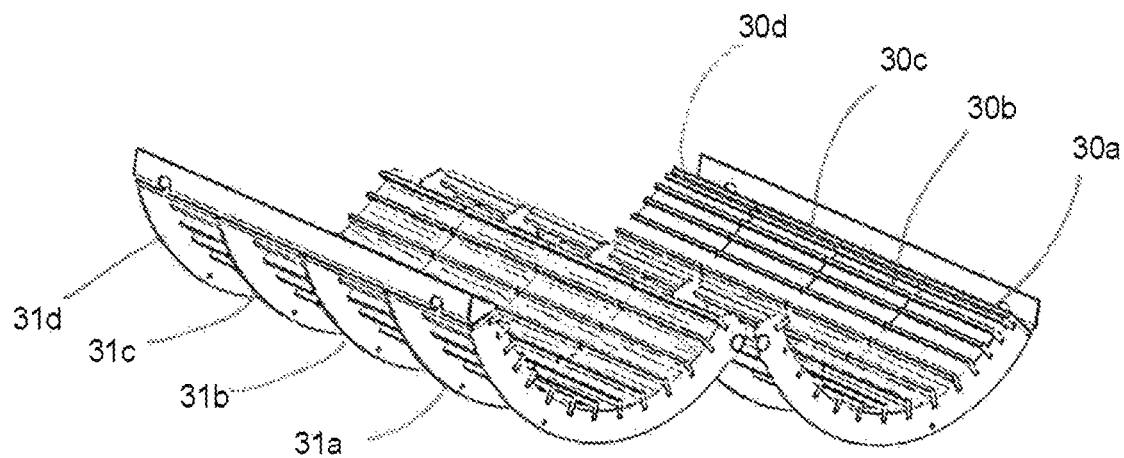
FIG. 3 illustrates two sets of concaves of the combine harvester of FIG. 1.
Figure 4:
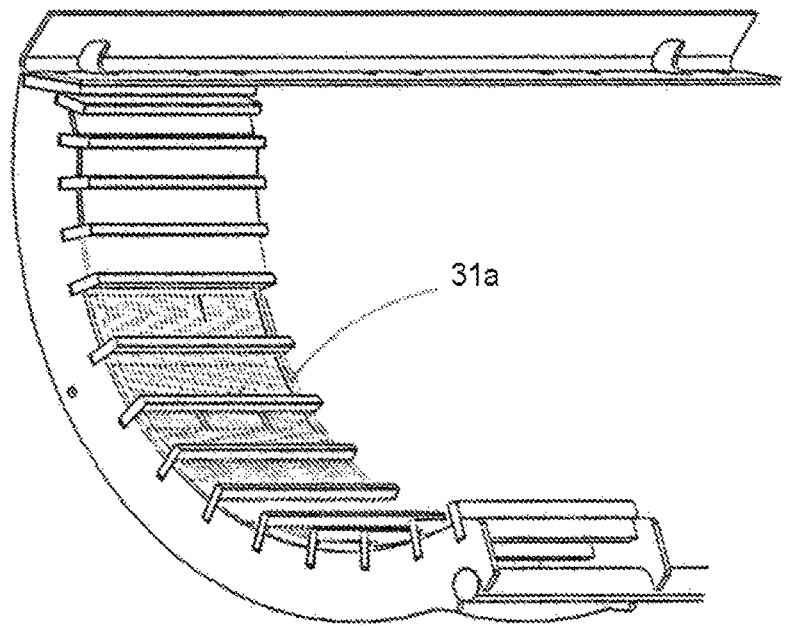
FIG. 4 shows a single concave portion of one of one of the concaves of FIG. 3.
Figure 5:
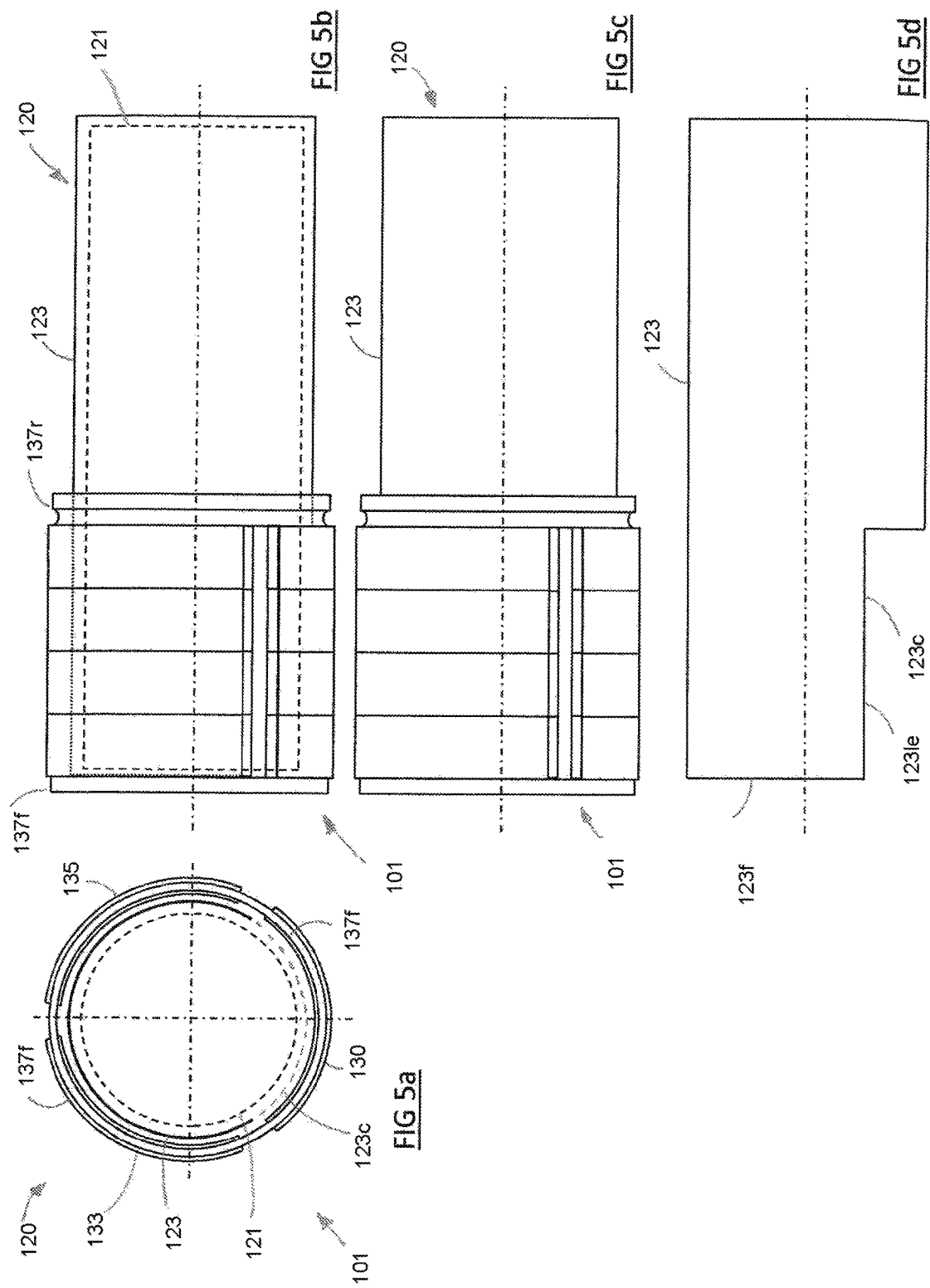
FIGS. 5a to 5d show parts of a concave support and adjustment structure of a rotary threshing system, in accordance with an embodiment of the present application, in schematic form.

FIGS. 5a to 5d show part of a rotary threshing system 120 which includes a concave support and adjustment structure 101. The system comprises a rotor which is shown by reference to its cylindrical swept volume 121. The system also comprises a rotor housing 123 which is generally cylindrical other than an arcuate cut-out section 123c located towards the front end 123f of the housing. This cut-out section 123c is for placement of a set of concaves 130, 133, 135 which, when in place, complete the containment envelope provided by the rotor housing. There are provided three sets of concaves 130, 133, 135, supported between common frame elements 137f and 137r, which in this case comprise essentially annular frames. Each concave set comprises four side-by-side arcuate concave grate segments 130a-d, 133a-d, 135a-d. The concave sets 130, 133, 135 are disposed on the frame elements 137f/137r such as to surround both the rotor and the local portion of the rotor housing. The frame elements and concaves are rotatable around the rotor and rotor housing, thus bringing any one of the concave sets 130, 133, or 135 into rotational alignment with the lower cut-away portion 123c of the rotor housing and allowing threshing to occur between the rotor and the aligned concave set. Accordingly, each concave set may comprise grate segments of differing characteristics, and should there be a requirement to change concaves at any time, due to for example a change in crop condition of the crop being harvested, the combine operator has three different sets of concaves readily available to choose from and may readily change them by rotating the concave sets around the rotor housing.

Figure 6:
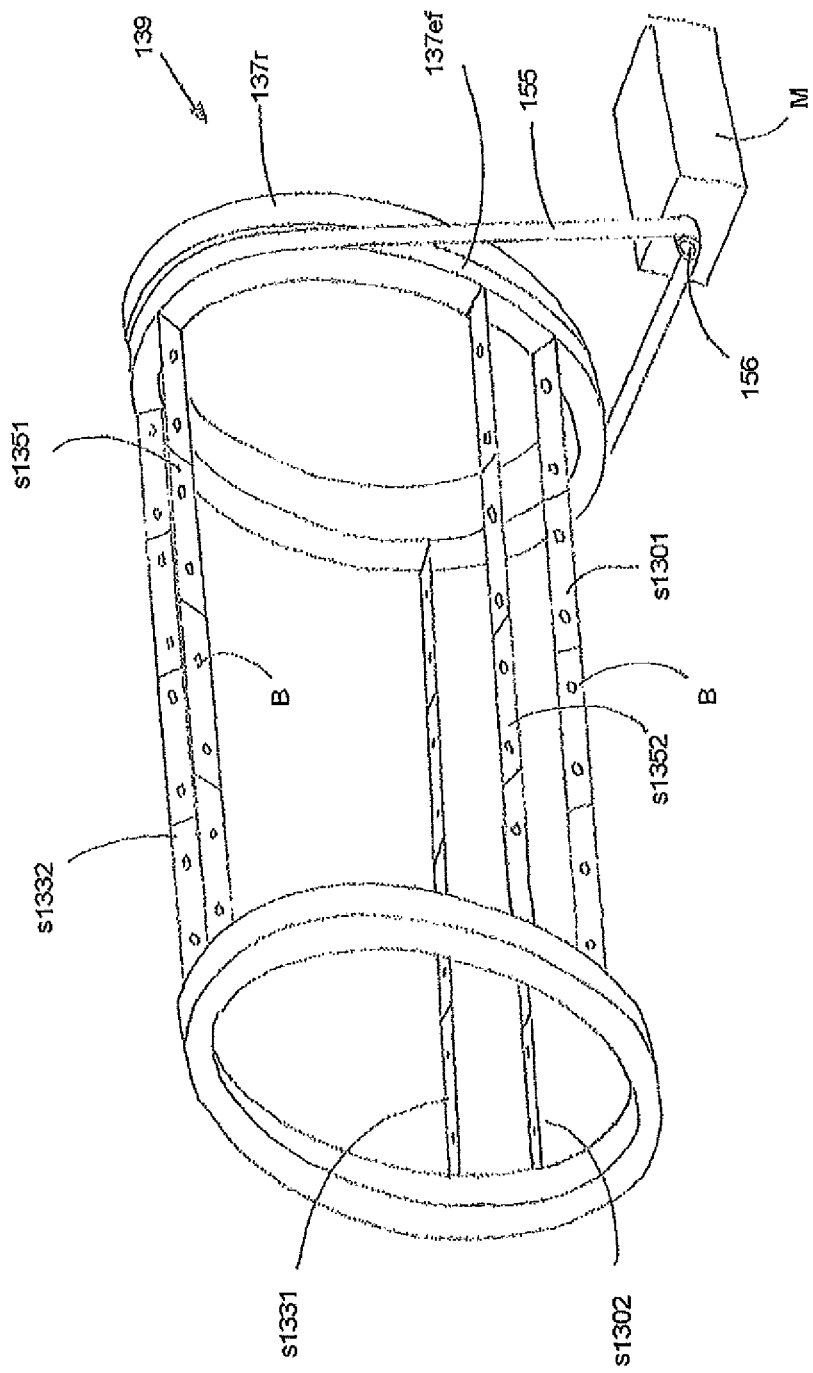
FIG. 6 illustrates a frame in which holds concaves of FIGS. 5a-5d.
Figure 6A:
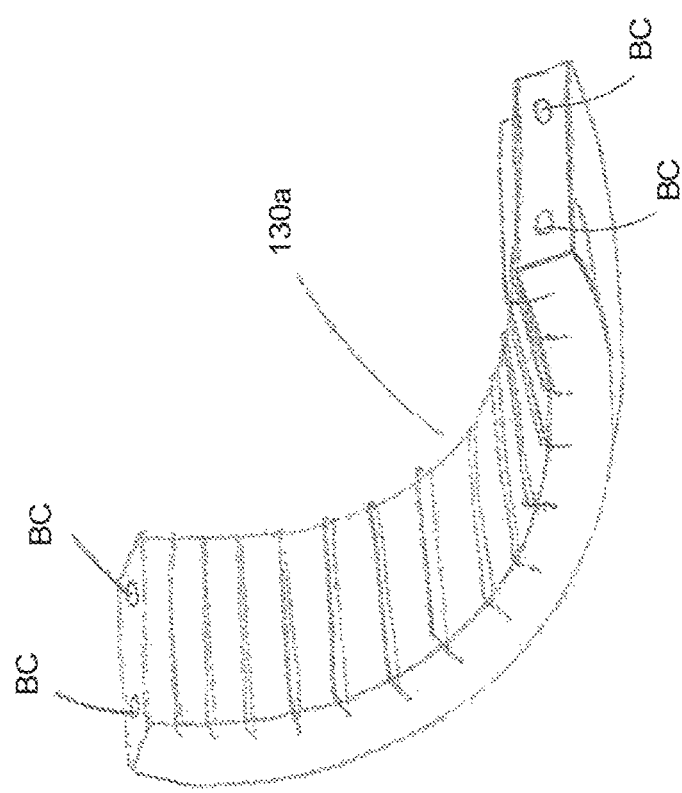
FIG. 6A illustrates on of the concaves of FIGS. 5a-5d.

FIG. 6 shows a view of a frame 139 to which the concave sets 130, 133 and 135 may be attached. The frame 139 comprises the frame elements 137f and 137r, disposed between which are six longitudinal stringers S1301, S1302, S1331, S1332, S1351 and S1352, to which concave grate segments may simply be bolted by means of the bolt holes B, of which there are 8 on each stringer. A complementary example of a suitable concave grate segment 130a is shown in FIG. 6a, with complementary bolt holes BC at either end for attaching each end of the grate segment to two of the stringers, in this case S1301 and S1302. It will be understood by the skilled person that different means of attaching the concave grate segment may be provided—for example, one end of the grate may be provided with stubs which correspond to the holes in stringer S1302, whilst the other end may be bolted to the holes in stringer S1301. FIG. 6 also shows a motor M for driving frame 139 by means of a belt 155 which engages with face 137ef and is driven by the motor M via pinion 156.

Figure 7:
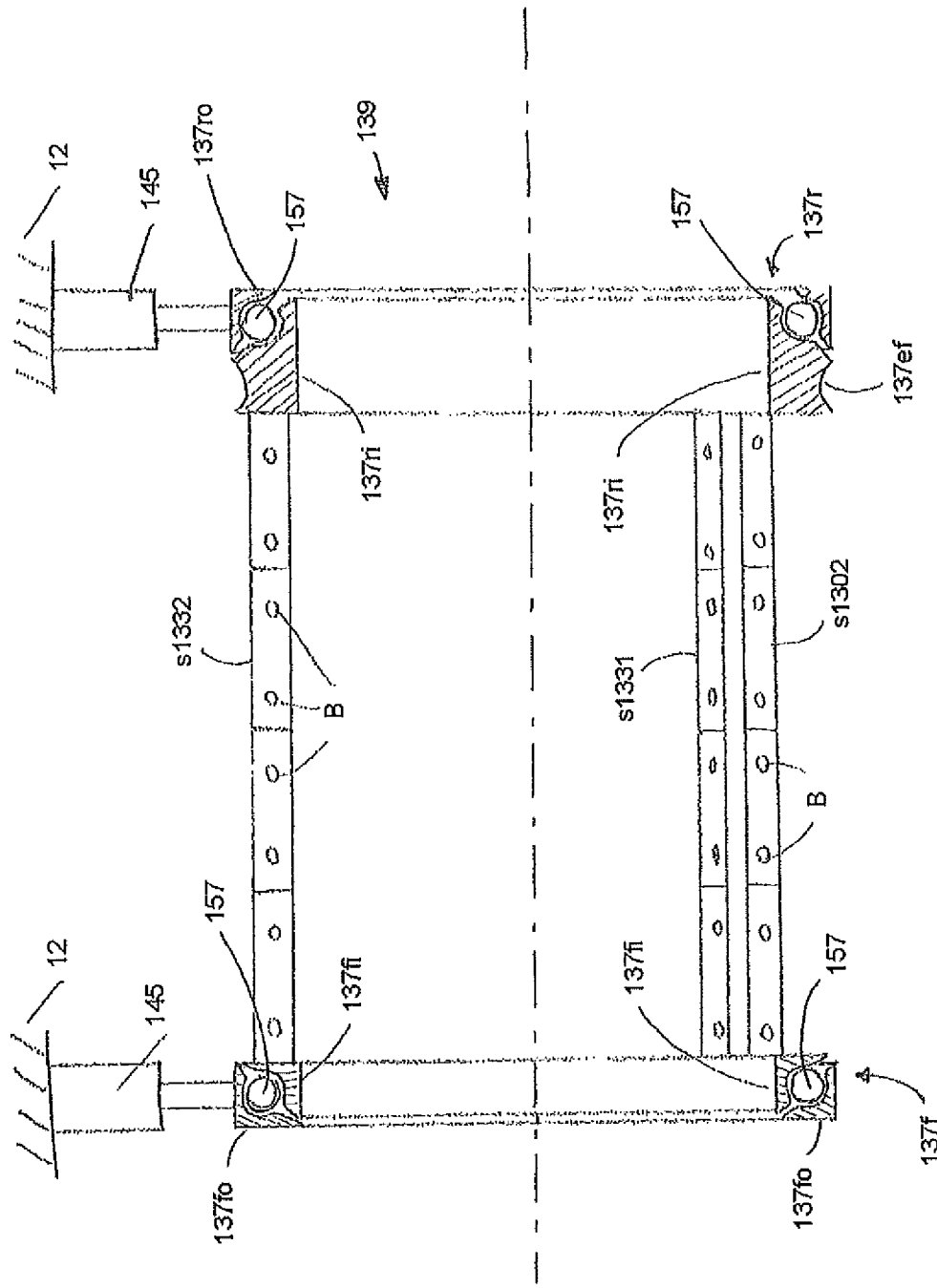
FIG. 7 illustrates a cross-sectional view through the frame of FIG. 6.

FIG. 7 shows a cross-sectional view through frame 139 which shows that each of the frame elements 137f and 137r is a large radial ball bearing with an inner portion 137fi and 137ri and an outer portion 137fo and 137ro respectively, with the inner portions supported by and running on ball bearings 157. The inner portions 137ri and 137fi are attached to and joined by the stringers S1301, S1302, S1331, S1332, S1351 and S1352. Accordingly, the whole inner frame (comprising 137ri, 137fi, and the stringers, plus any attached concave segments) is able to rotate relative to the outer portions 137fo and 137ro. The inner portion 137ri of the rearwards frame element 137r is also provided with an engagement feature, 137ef, which allows for the provision of a belt drive to rotate the inner frame portion. This is shown diagrammatically in FIG. 6 where belt 155 connects the engagement feature to a motor M. It will be understood by the skilled person that alternative means of rotating the inner frame portion (inner portions 137fi, 137ri of the frame elements 137f and 137r, the stringers and any attached concave set or concave grate segments) may be provided. There may alternatively be an engagement portion comprising gear teeth for direct driving by a motor with a corresponding gear wheel. In one embodiment, the inner frame portion is simply rotated by hand by an operator in order to change concave sets, and may be locked in position (with one or other of the concave sets in the threshing position) with something as simple as a bolt and latch/striker arrangement.

As is shown in FIGS. 7 to 10, the whole concave support and adjustment structure 101 may be supported on hydraulic rams 145 which are attached to outer portions 137*fo* and 137*ro*, and are thus able to move the structure 101 up in the direction of arrow U1 as shown in FIG. 8*b*, thus adjusting the distance d between the aligned concave set (130 in this case) and the rotor envelope 121 and also, in this embodiment with this geometry, closing the gap between the upper corners 130*uc* of the concave set 130 and the longitudinal edges 123*le* of the cut out section 123*c* or the rotor housing. It will be appreciated that careful selection of the geometry of the parts of the structure 101 will ensure that 137*r* will either not contact, or will only gently contact, the lower part of the rotor housing even when structure 101 is raised to its highest point.

Figure 9E:
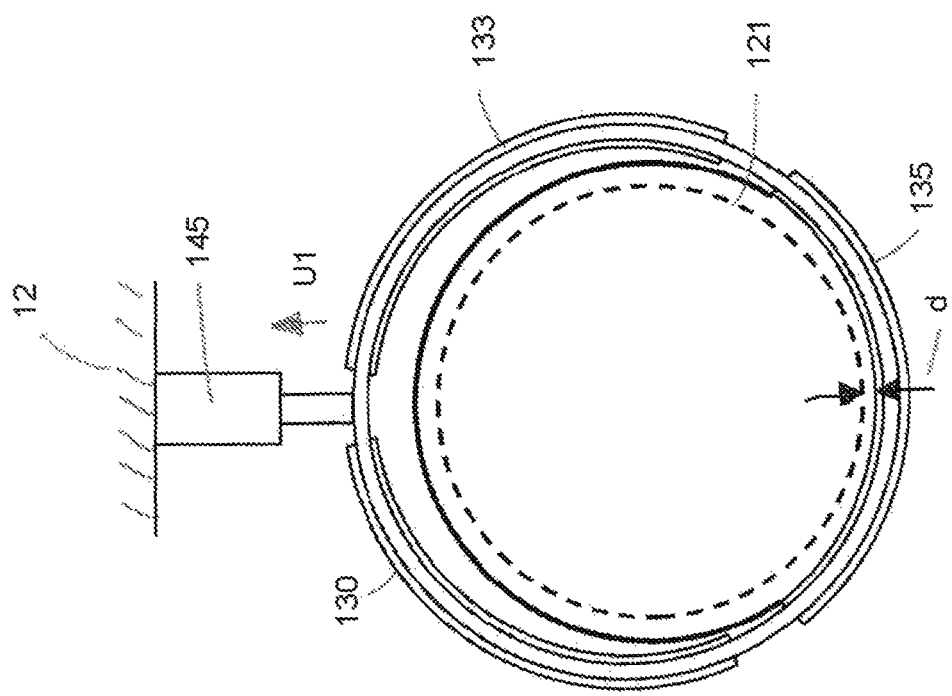
FIG. 9e illustrates the concave support and adjustment system of FIGS. 5a-5d.
Figure 9D:
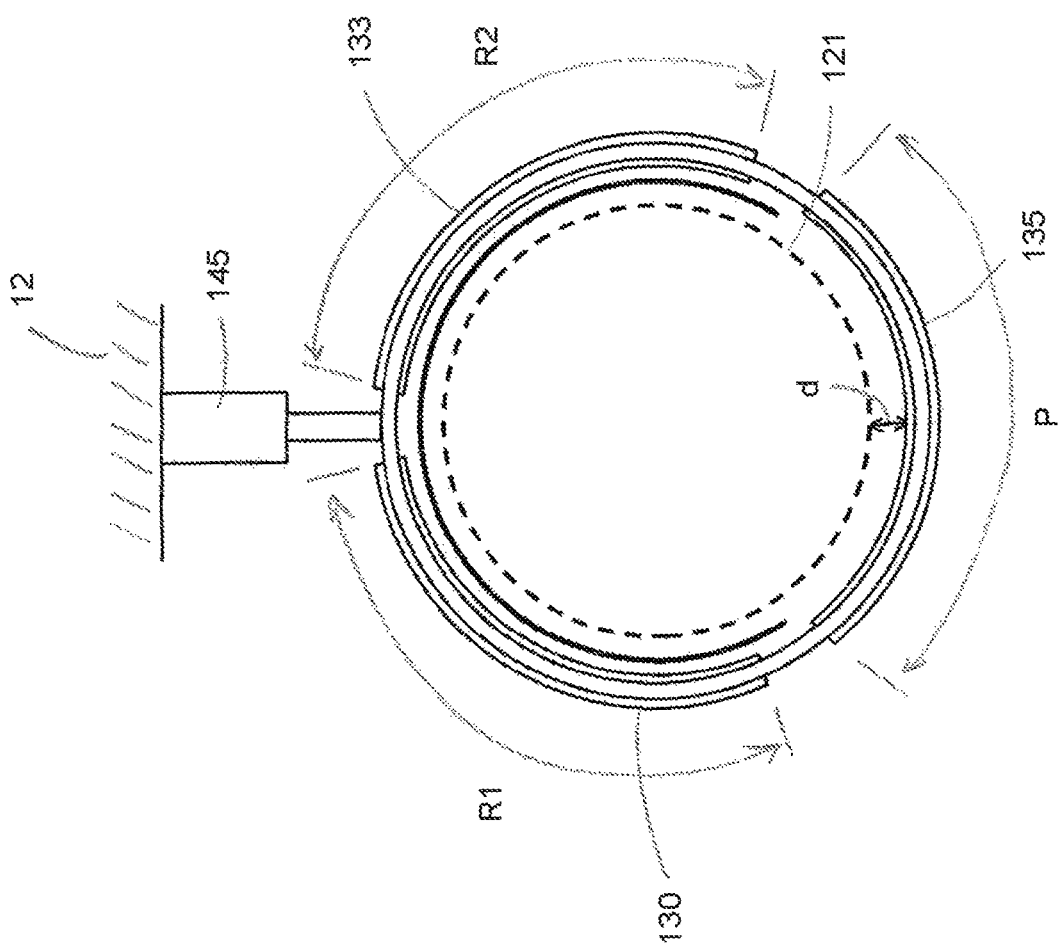
FIG. 9d illustrates the concave support and adjustment system of FIGS. 5a-5d.

Accordingly, as shown in FIGS. 9*a* to 9*e*, and accompanying FIGS. 10*a* to 10*d*, the invention according to this application may be used as follows: As per FIGS. 9*a*, 10*c* and 10*d*, structure 101 may be in the raised position with concave set 130 in the threshing position P and in close proximity to the rotor envelope 121, with alternate concave sets 133 and 135 in resting positions R1 and R2 respectively, during a harvesting procedure. At some point, a characteristic of the crop being harvested changes, and the combine operator wishes to change concave sets. At this time, the harvester may cease its forward motion, and the structure 101 may be lowered by actuator 145 in the direction of arrow D as per FIGS. 9*b* (and 10*a* and 10*b*). Then, structure 101 is rotated in the direction of arrow Q as shown in FIG. 9*c* so that concave set 135 moves towards the threshing position P and concave set 130 moves around the rotor housing from the threshing position P and up to resting position R1, as seen in FIG. 9*d*. Also in 9*d* can be seen that concave set 133 has moved from resting position R1 to resting position R2. Finally, as seen in FIG. 9*e*, the structure 101 is moved back upwards in the direction of arrow U1 so that newly placed concave set 135 is in close proximity to the rotor envelope 121 and the combine may be restarted.

It will be appreciated that other arrangements of structure, which may be provided to allow for the rotation of concaves around the rotor housing and into a threshing position, will be readily available to the skilled person, as may other means of turning the structure 101 such as a toothed gear wheel arrangement as previously discussed. Also other means of connecting concaves to the frame structure 101, other than bolts, will be readily available and understood as previously discussed. Actuators 145 will be readily understood to be one or more of any number of possible types, such as hydraulic or pneumatic cylinders or electrically powered servos of various kinds. Various means of registering the position of the various concave sets will also be readily understood, as will various means of locking any particular concave set in position, from the simple application of bolts through spaced holes in the inner and outer parts 137*fo*/137*fi* or 137*ro*/137*ri* of either of the ball race frames, through a solenoid driven equivalent or any number of possible electrically or electronically controlled actuators which will be familiar to those skilled in the relevant art.

Further, although the given embodiment in FIGS. 5 to 10 comprises three concave sets arranged to as to rotate around the rotor (and part of the rotor housing) so that any of the concaves may move to the threshing position and to the first or second resting position, it is within the ambit of this application to provide a frame to which are connected more concave sets, such as four concave sets, or indeed only two concave sets. While the frame ends in the present embodiment are shown as annular, it may be, in for example the situation where only two concave sets are attached, that the frame ends comprise only part of a full annulus and are thus more arcuate in form.

The invention of this application may be understood further in relation to the following clauses:

Clause 1. A rotary thresher comprising:
  a rotor;
  a first concave located at a lower portion of the thresher, said first concave thereby located in a threshing position such as to be proximate to the rotor such that cut crop material may be threshed between said rotor and said first concave;
  characterised in that the apparatus further comprises:
  a frame;
  a second concave disposed on said frame;
  said first concave also disposed on said frame, such that the first and second concaves at least partially surround the rotor, and;
  wherein the frame is mounted so that it may be moved to rotate around the rotor such that the second concave may be moved from a first rest position to the threshing position whilst the first concave is moved from the threshing position to a second resting position.

Clause 2. A rotary thresher as described in clause 1, further comprising a rotor housing comprising a generally hollow cylinder, and wherein the concaves rotate or move around the outside of the rotor housing.

Clause 3. A rotary thresher as described in clause 2, wherein the rotor housing has a cut out section and the threshing position is coincident with said cut out section.

Clause 4. A rotary thresher as described in clause 3, wherein the rest positions are coincident with portions of the rotor housing other than the cut out section.

Clause 5. A rotary thresher as described in clause 1 wherein there is further provided a driving mechanism for moving the frame so as to rotate the first and second concaves around the rotor.

Clause 6. A thresher as described in clause 5, said driving mechanism comprising a belt and motor for driving an engagement section of the frame, said engagement section for being driven by the belt.

Clause 7. A thresher as described in clause 5, said driving mechanism comprising an engagement section on the frame comprising a geared track, and a corresponding gear wheel driven by a motor Clause 8. A thresher as described in clause 1 wherein the frame may be locked in place such that at least one of the concaves may be locked into the threshing position.

Clause 9. A thresher as described in clause 1 wherein there is further provided at least one further concave which is also connected to the frame and which may be moved to the threshing position and one or more of the first or second resting positions or to any further resting position.

Clause 10. A thresher as described in clause 1 wherein the frame may be raised and lowered relative to the rotor.

Clause 11. A thresher as described in clause 10 wherein the frame may be raised and lowered by an actuator.

Clause 12. A thresher as described in clause 10 wherein the frame may be raised and lowered so as to alter a clearance between said rotor and a concave in the threshing position.

Clause 13. A thresher as described in clause 10 wherein the frame may be raised so as to bring a concave in the threshing position into alignment with the cut out section of the rotor housing.

Clause 14. A rotary thresher comprising:
A rotor;
Two or more concaves disposed on a frame surrounding the rotor and said frame mounted so that it may be rotated around the rotor;
Characterised in that:
During a harvesting process, the frame is stationary such that one of the concaves is located in a stationary threshing position situated at a lower portion of the thresher.

Clause 15. A thresher as described in clause 14, wherein when one of the concaves is in the threshing position, it is in closer proximity to the rotor than the other concaves.

Clause 16. A thresher as described in clause 14, wherein there is also provided a stationary rotor housing comprising a generally hollow cylinder, and wherein a section of stationary non-foraminous rotor housing is located between the rotor and the one or more concaves which are not in the threshing position.

Clause 17. A thresher as described in clause 14 wherein the frame may be raised and lowered relative to the rotor.

Clause 18. A combine harvester comprising a thresher as described in any previous clause.

Clearly the skilled person will recognise that various aspects, embodiments and elements of the present application, including as illustrated in the figures or described in the clauses above, may be arranged in differing combinations, any and all of which may be considered to fall within the ambit of the inventive concept. The invention will be defined by the following claims.

The invention claimed is:

1. A rotary thresher for a combine harvester comprising:
a rotor;
a first concave located at a lower portion of the thresher, in a threshing position proximate to the rotor such that received cut crop material is threshed between the rotor and the first concave;
a frame;
a second concave, wherein the first concave and the second concave are located on the frame such that the first and second concaves at least partially surround the rotor; and
a stationary rotor housing comprising a generally hollow cylinder, and wherein the first and second concaves rotate or move around the outside of the rotor housing, wherein the rotor housing has a cut out section and the threshing position is coincident with the cuto out section, wherein the frame is configured to rotate around the rotor and rotor housing such that the second concave moves during rotation from a first resting position to the threshing position while the first concave is moved from the threshing position to a second resting position, wherein the and second resting positions are coincident with portions of the rotor housing other than the cut out section.

2. The rotary thresher as claimed in claim 1, further comprising a driving mechanism for moving the frame and rotation the first and second concaves around the rotor.

3. The thresher as claimed in claim 2, said driving mechanism comprising a belt and motor for driving an engagement section of the frame, said engagement section being driven by the belt.

4. The thresher as claimed in claim 2, the driving mechanism comprising an engagement section on the frame comprising a geared track, and a corresponding gear wheel driven by a motor.

5. The thresher of claim 1, comprising at least one further concave also connected to the frame and moveable to the threshing position and one or more of the first, the second, or a further resting position.

6. The rotary thresher for a combine harvester comprising:
a rotor;
a first concave located at a lower portion of the thresher, in a threshing position proximate to the rotor such that received cut crop material is threshed between the rotor and the first concave;
a frame;
a second concave, wherein the first concave and the second concave are located on the frame such that the first and second concaves at least partially surround the rotor;
wherein the frame is configured to rotate around the rotor such that the second concave moves during rotation from a first resting position to the threshing position while the first concave is moved from the threshing position to a second resting position; and
wherein the frame is configured to be raised and lowered relative to the rotor to alter a clearance between the rotor and the concave in the threshing position.

7. The thresher as claimed in claim 6, wherein the frame is raised and lowered by an actuator.

8. The thresher of claim 6, wherein the frame when raised brings the concave in the threshing position into alignment with a cut out section of the rotor housing.

9. The rotary thresher as claimed in claim 6, further comprising a rotor housing comprising a generally hollow cylinder, and wherein the first and second concaves rotate or move around the outside of the rotor housing.

10. The rotary thresher as claimed in claim 9, wherein the rotor housing has a cut out section and the threshing position is coincident with said cut out section.

11. The rotary thresher as claimed in claim 10, wherein the first and second resting positions are coincident with positions of the rotor housing other than the cut out section.

12. A rotary thresher for a combine harvester comprising:
a rotor;
two or more concaves located on a frame surrounding the rotor wherein the frame is configured to rotate around the rotor;
a stationary non-foraminous rotor housing comprising a generally hollow cylinder;
wherein, during a harvesting process, the frame is stationary such that one of the concaves is located in a stationary threshing position at a lower portion of the thresher;
wherein the one of the concaves in the threshing position, is in closer proximity to the rotor than the concaves not in the threshing position; and
wherein a section of the stationary housing is located between the rotor and the or one of the concaves not in the threshing position.

13. The thresher of claim 12, wherein the frame may be raised and lowered relative to the rotor.

\* \* \* \* \*